Patented May 10, 1932 1,857,987

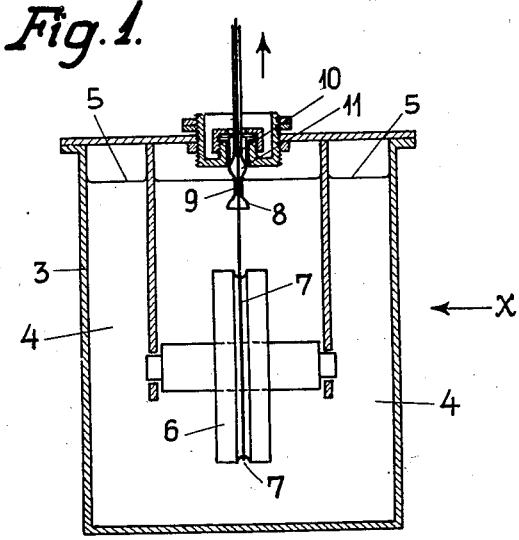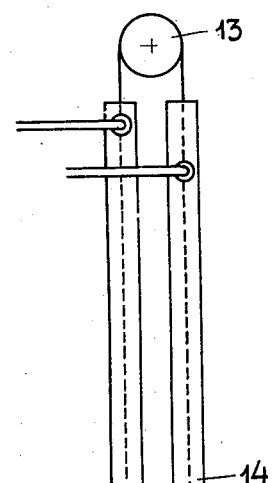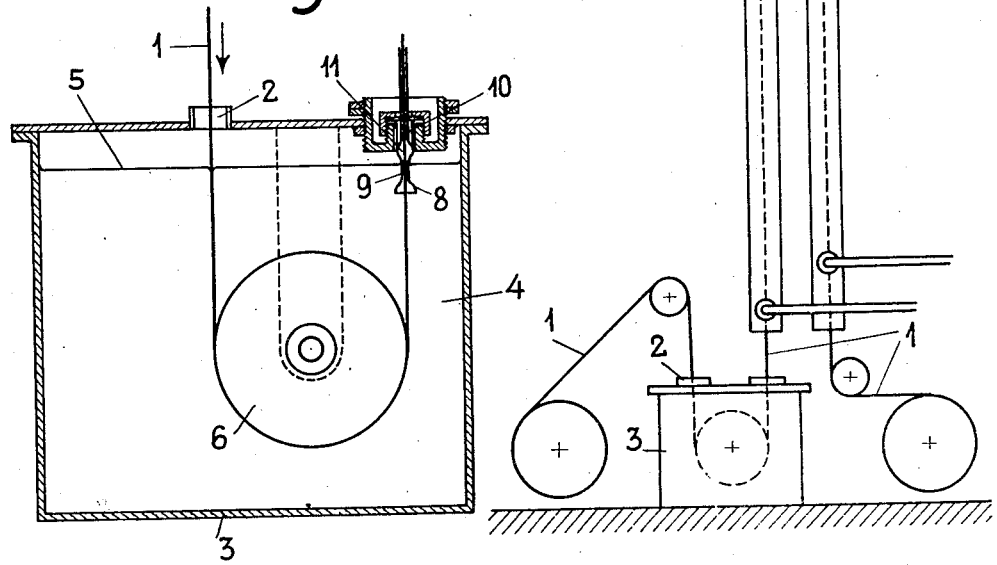

UNITED STATES PATENT OFFICE

DOUGLAS FRANK TWISS AND EDWARD ARTHUR MURPHY, OF BIRMINGHAM, ENGLAND, ASSIGNORS TO THE ANODE RUBBER COMPANY LIMITED

COVERING OF WIRE, THREAD-LIKE AND FILAMENTARY MATERIAL, AND THE LIKE, WITH INDIA RUBBER, GUTTA-PERCHA, BALATA, OR SIMILAR MATERIALS OR COMPOUNDS THEREOF AND APPARATUS THEREFOR

Application filed January 18, 1928, Serial No. 247,736, and in Great Britain January 28, 1927.

This invention consists in an improved process and apparatus for providing wire, thread-like and filamentary material with a coating of india-rubber, gutta percha, balata or similar materials or mixtures of the same.

One object of this invention is to provide a covering for wire such as copper or tinned copper wire or threads of any material— whether single or in groups, or spun, twisted, doubled, plaited, braided and the like which shall be suitable for insulating, protecting or covering the said wire or threads for electrical or any other purposes.

Another object of the invention is to form a rubber coated thread of circular cross section and a further object is to provide filaments the cores of which are largely absorbed into the coatings during drying and/or vulcanization.

According to the invention the improved process consists in causing wire, thread-like or filamentary material to pass through a bath containing an aqueous dispersion in the form of a cream or of viscous consistency and comprising india-rubber, gutta percha, balata or similar materials or more than one of said materials, then drying the coatings and vulcanizing the same if necessary. The dispersions may be prepared by concentrating natural or artificial dispersions or by incorporating, by mixing or agitating, additional materials such as protective colloids or stabilizing agents or both and one or more compounding ingredients comprising reinforcing agents, diluents, softeners, vulcanizing agents, anti-agers and colouring matters with aqueous dispersions containing rubber or rubber like materials and then concentrating the whole by drying. Advantageously the completion of the incorporation of the additional materials by mixing or agitation is effected during the concentration so that uniform creams are obtained. The aqueous dispersions may contain rubber wholly or partially in the form of previously dispersed vulcanized rubber such as rubber reclaim or waste. It will be understood that the term "rubber composition or rubber like materials" as used in the following claims includes any of the natural or artificial types of live rubber, balata, vulcanized rubber or reclaimed rubber, or mixtures of these various materials with other compounding materials. If desired also the dispersions may contain preserving agents such as ammonia and also may be pre-vulcanized.

In adapting the invention to the manufacture of circular rubber-coated thread the filamentary material above referred to may consist of some amorphous colloidal material which can be drawn out into a very thin thread for example from a viscous fluid or solution. It is desirable for this purpose that the filament shall be one which can be absorbed or partially absorbed into the surrounding rubber layer subsequent to the coating operation namely during drying or vulcanization processes. Filaments of tacky or resinous rubber or of glue mixed with rubber are typical and give after coating and vulcanization a soft rubbery cord showing no signs of any less extensible core. The tacky or resinous rubber which may be of the Euphorbia or Jelutong or similar natural types or may be of ordinary Hevea rubber to which the desired consistency has been imparted by suitable compounding and mastication is, when warm, easily drawn into threads. Filaments of glue can conveniently be produced from aqueous solutions to which other ingredients, for example, rubber latex, may have been added if desired. Other viscous materials for example artificial silk fibres, sodium silicate, resins and the like, can be used for a somewhat similar purpose either alone or mixed with rubber or with rubber latex while natural silk, or cotton or similar material may be employed as the filamentary material.

According to the preferred method of carrying our invention into effect wire or thread-like or filamentary material which it is desired to coat is passed or guided into a bath containing the dispersion with or without the additional ingredients above referred to. The said wire or filamentary material is passed under a grooved roller situated below the level of the dispersion and then upwards to leave the bath through a suitably shaped tube. The tube last referred to may be formed of glass or other non-corroding material and is preferably circular in cross section and constricted near the level of the surface of the latex.

By this construction the upper end of the tube forms a kind of cup into which a portion of the latex is drawn by the moving wire or filament which therefore finally issues from a small concentric circular surface of dispersion thereby ensuring a smooth and even distribution of the adherent deposit; the constriction also tends to check the accidental passage of air bubbles from the bath into the cup. The wire or filamentary material issuing from the tube is therefore coated with a fine uniform and smooth deposit. The coated wire or filament is passed through a suitable warm space or vessel to dry the deposit.

An example of a dispersion suitable for the purpose of this invention is as follows:— 8 parts of zinc oxide, 2.5 parts of sulphur, lamp black 1, talc 20, whiting 15, paraffin wax 2 (previously emulsified in water), mineral rubber 1 (previously finely ground), are mixed with 100 parts of water containing 0.1 part of caustic potash, 0.3 part of oleic acid and 0.3 part of casein. A sufficient degree of dispersion for this stage can be attained in a few minutes. Ammonia-preserved latex is then added in sufficient quantity to introduce 60 parts of rubber, caustic potash having been previously introduced into the latex so that the 60 parts of rubber are accompanied by 0.4 part of caustic potash. The whole is then mixed and concentrated by direct evaporation. A concentration to 75% total solids is convenient especially if the product is to be used for dipping operations.

At the completion of the concentration the mixture is allowed to cool, the agitation being still continued whilst ammonia (e. g., 1 part of concentrated aqueous ammonia of specific gravity 0.880), is added; an accelerator in suitable amount such as 0.3 part of diethylammoniumdiethyldithiocarbamate may, if desired, be introduced at the same time. It is desirable to continue the agitation for a short time e. g. a few minutes until the ammonia (with any accelerator) is uniformly dispersed.

Another example is as follows:—20 parts of whiting, 2 parts of zinc oxide, 1 part of organic dye e. g. tolueneazo-naphtol, 1½ of sulphur, 0.5 part of tetramethyl thiuram monosulphide, 3 parts of petroleum jelly (emulsified in water), 8 parts of lithopone, are placed in a mixer and concentrator together with 100 parts of water containing in solution 0.3 part of oleic acid, 0.2 part of casein and 0.1 part of caustic potash. After a smooth dispersion has been obtained by agitation sufficient latex is added to introduce 64 parts of rubber together with 0.5 part of caustic potash. The whole is then mixed under gentle agitation and concentrated to the desired consistency. In any case it is desirable to continue the agitation and mixing action until the final mixture is obtained in a uniform condition. Stable creams containing up to 80% of total solids can be obtained in this way.

Still another example is:—16½ parts of whiting, 25 parts of French chalk, 16 parts of zinc oxide, and 2 parts of sulphur are placed in a mixer-concentrator together with 100 parts of water containing in solution 0.1 part of casein, 0.1 part of oleic acid and 0.05 part of potassium hydroxide.

After a smooth dispersion has been obtained by agitation sufficient latex is added to introduce 40 parts of rubber together with 0.5 part of potassium hydroxide. The whole is then mixed under gently agitation and concentrated to the desired consistency.

Near the end of the concentration 0.5 part of piperidine piperidinecarbothionolate in 5 parts of water is added and the agitation and mixing action continued until the mixture is obtained in a uniform condition. Stable creams containing up to 80% of total solids can be obtained in this way.

And a further example is:—A cream containing 60 parts of rubber, 2 parts of lamp black, 10 parts of zinc oxide, 10 parts of whiting, 15½ parts of French chalk, 0.5 part of piperidine piperidinecarbothionolate, 0.1 part of casein, 0.1 part of oleic acid and 0.6 part of potassium hydroxide, is made up substantially as described in the immediately preceding example.

In order that our said invention may be more clearly understood and readily carried into effect, the same will now be described by way of example with reference to the accompanying diagrammatic drawings, in which Figure 1 is a cross section of the coating apparatus, Figure 2 is a sectional side elevation thereof and Figure 3 is a diagrammatic view showing the general arrangement of the coating apparatus with drying and vulcanizing means.

Referring particularly to Figures 1 and 2 the wire or thread-like filamentary material 1 is passed through a suitable orifice 2, downwardly into a bath 3 containing latex 4 whereof the level is shown at 5. The wire or filament 1 is guided through the latex by a roller 6, suitably grooved as shown at 7, from whence it passes upwards and out from the bath through a tube preferably of glass constricted as shown at 9. The moving wire or filament 1 draws a quantity of latex 11 into the cup 10 formed by the constriction 9 and thus the wire or filament finally issues from a small concentric circular surface of latex, thereby ensuring a smooth and even distribution of the adherent deposit. The constriction 9 tends also to check the accidental passage with the deposit of air bubbles from the latex bath.

The deposit is preferably continuously dried and vulcanized. Thus, in the arrangement shown in Figure 3, the wire or filament may be passed upwardly from the bath 3 through a tubular drying chamber 12, over a pulley 13 and downwardly through a tubular vulcanizing chamber 14.

The chambers 12 and 14 are preferably suitably jacketed for the circulation of heating fluid such as steam or water, and provision may also be made to maintain the columns of air within the said chambers in circulation also. In general, however, it will be understood that we do not confine ourselves to any particular treatment of the wire or filament subsequent to the coating, the scheme illustrated diagrammatically in Figure 3 being given merely by way of example.

Having now particularly described and ascertained the nature of our said invention and in what manner the same is to be performed, we declare that what we claim is:—

1. A process of coating filamentary materials uniformly with a rubber composition which comprises passing the material through a bath of a viscous dispersion of rubber constituents, and withdrawing the filamentary material and the dispersion materials adhering thereto through a restriction and thence centrally through a limited body of said dispersion material and centrally through the surface of said limited body of dispersion material.

2. A process of coating filamentary materials uniformly with a rubber composition which comprises passing the material through a bath of a viscous dispersion of rubber constituents, withdrawing the filamentary material and the dispersion materials adhering thereto through a restriction and thence centrally through a limited body of said dispersion material and centrally through the surface of said limited body of dispersion material, and vulcanizing said filamentary material and adhering rubber composition.

3. A process of coating filamentary materials uniformly with a rubber composition which comprises passing the material through a bath of a viscous dispersion of rubber constituents, withdrawing the filamentary material and the dispersion materials adhering thereto through a restriction and thence centrally through a limited body of said dispersion material and centrally through the surface of said limited body of dispersion material, and vulcanizing said filamentary material and the dispersion constituents adhering thereto under such conditions as to cause an absorption of said filamentary material in said dispersion constituents.

In testimony whereof we affix our signatures.

DOUGLAS FRANK TWISS.
EDWARD ARTHUR MURPHY.